US012689531B2

(12) United States Patent
Venkatesan et al.

(10) Patent No.: US 12,689,531 B2
(45) Date of Patent: Jul. 21, 2026

(54) INCREMENTAL VERIFICATION OF TAMPER-RESISTANT LEDGER

(71) Applicant: Microsoft Technology Licensing, LLC, Redmond, WA (US)

(72) Inventors: Ramarathnam Venkatesan, Redmond, WA (US); Mariusz H. Jakubowski, Bellevue, WA (US); Kartik Gupta, Seattle, WA (US); Subhra Bose, Ossining, NY (US); Paul Alan Stirpe, Shoreham, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 18/769,029

(22) Filed: Jul. 10, 2024

(65) Prior Publication Data

US 2026/0019286 A1     Jan. 15, 2026

(51) Int. Cl.
*H04L 9/00*         (2022.01)
*H04L 9/32*         (2006.01)
*H04L 9/40*         (2022.01)

(52) U.S. Cl.
CPC ............. *H04L 9/40* (2022.05); *H04L 9/3218* (2013.01); *H04L 9/50* (2022.05)

(58) Field of Classification Search
CPC . H04L 9/40; H04L 9/3218; H04L 9/50; H04L 2209/56
See application file for complete search history.

(56) References Cited

U.S. PATENT DOCUMENTS

2020/0076572 A1*   3/2020   Irazabal ................ H04L 9/3239
2020/0145214 A1*   5/2020   Linton .................. H04L 9/3218
2020/0396087 A1*  12/2020   Zabetian .............. H04L 63/126
2022/0043928 A1*   2/2022   Li ......................... H04L 9/3239

OTHER PUBLICATIONS

Chen, et al., "Reducing Participation costs via Incremental Verification for Ledger Systems", International Association for Cryptologic Research (IACR), Apr. 28, 2023, 49 Pages.
International Search Report and Written Opinion received for PCT Application No. PCT/US2025/034404, mailed on Oct. 17, 2025, 13 Pages.

* cited by examiner

*Primary Examiner* — Andrew Suh

(57) ABSTRACT

Incremental verification of a tamper-resistant ledger is disclosed herein. Periodic proofs are generated by periodically verifying the integrity of a tamper-resistant ledger. The periodic proofs enable a verifier to incrementally verify the integrity of the tamper-resistant ledger by verifying the periodic proofs. A periodic proof is generated based on a preceding proof and entries added to the tamper-resistant ledger since the preceding proof. A verifier verifies a periodic proof based on the preceding proof and the entries added to the ledger between preceding proof and the proof being verified. An action is performed responsive to verifying the integrity of the tamper-resistant ledger.

20 Claims, 7 Drawing Sheets

400

402 — Obtain a first proof associated with a verification of the integrity of a tamper-resistant ledger at a first point in time 404 — Obtain, at a second point in time occurring after the first point in time, entries added to the tamper-resistant ledger between the first point in time and the second point in time 406 — Perform, based on the first proof value and the entries added to the tamper-resistant ledger between the first point in time and the second point in time, a second proof to verify the integrity of the tamper-resistant ledger at the second point in time 408 — Provide the second proof to a server maintaining periodic proofs associated with periodic verifications of the integrity of the tamper-resistant ledger at periodic points in time

400

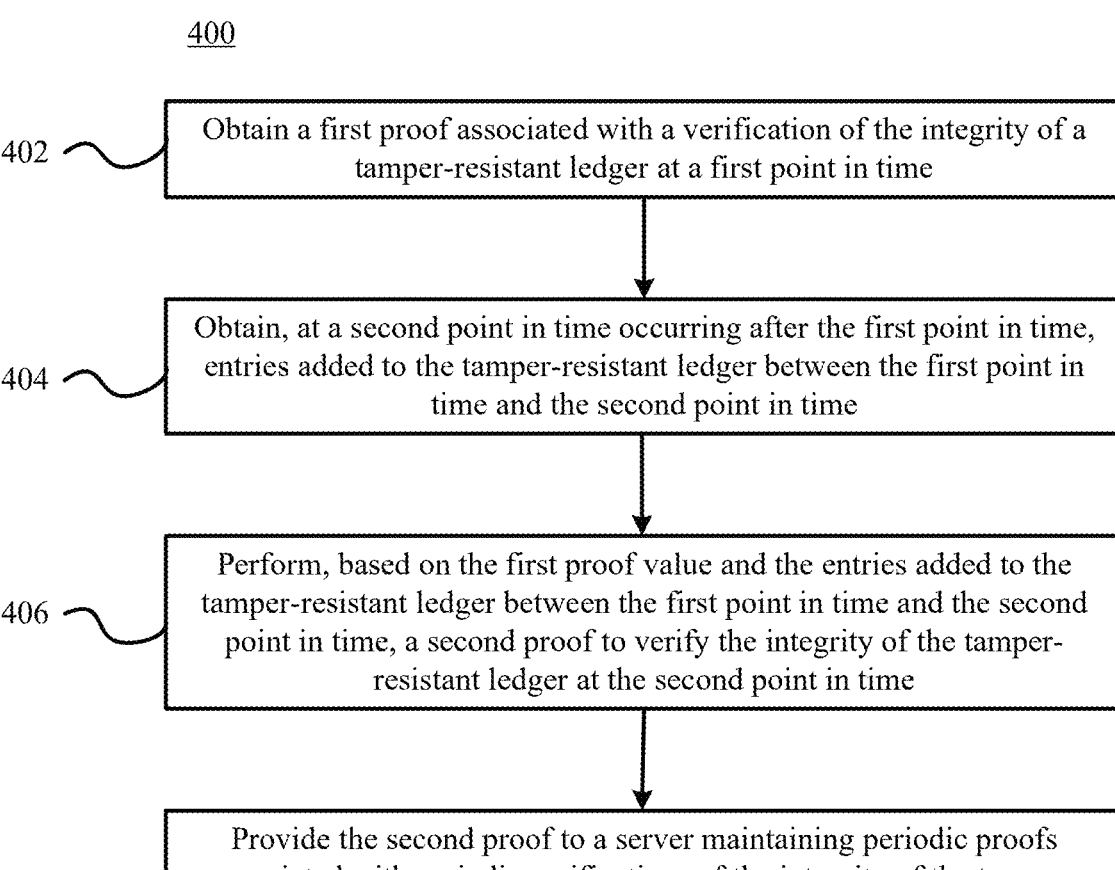

402 — Obtain a first proof associated with a verification of the integrity of a tamper-resistant ledger at a first point in time 404 — Obtain, at a second point in time occurring after the first point in time, entries added to the tamper-resistant ledger between the first point in time and the second point in time 406 — Perform, based on the first proof value and the entries added to the tamper-resistant ledger between the first point in time and the second point in time, a second proof to verify the integrity of the tamper-resistant ledger at the second point in time 408 — Provide the second proof to a server maintaining periodic proofs associated with periodic verifications of the integrity of the tamper-resistant ledger at periodic points in time

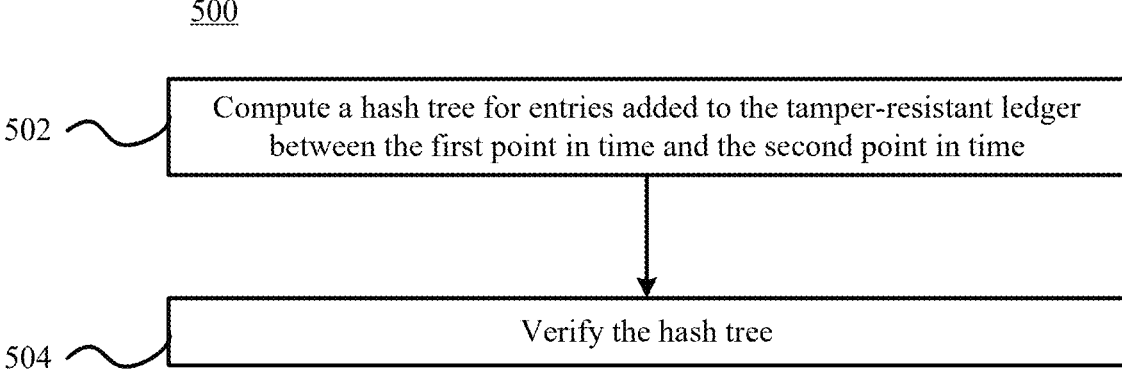

502 — Compute a hash tree for entries added to the tamper-resistant ledger between the first point in time and the second point in time 504 — Verify the hash tree

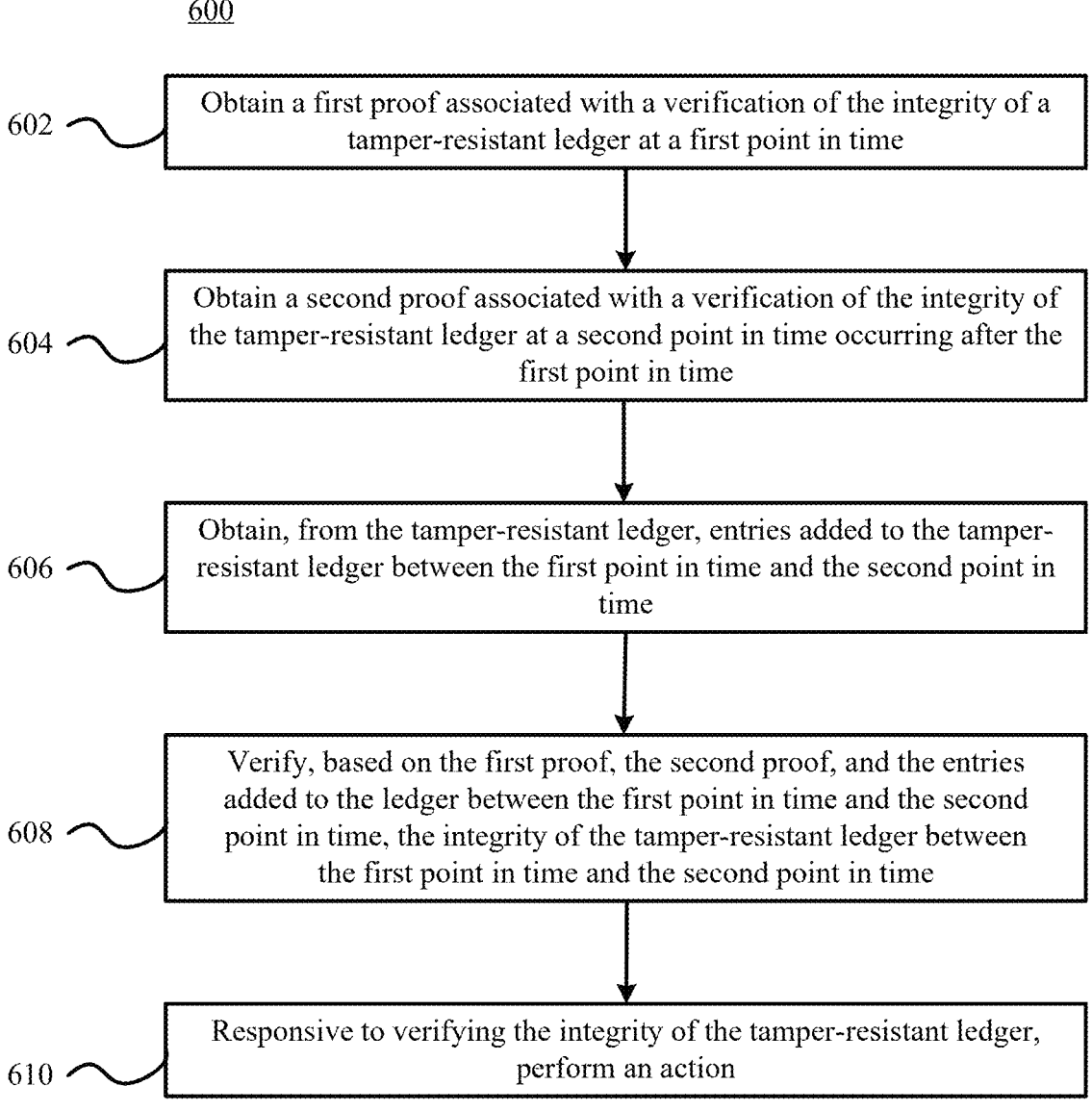

602 — Obtain a first proof associated with a verification of the integrity of a tamper-resistant ledger at a first point in time 604 — Obtain a second proof associated with a verification of the integrity of the tamper-resistant ledger at a second point in time occurring after the first point in time 606 — Obtain, from the tamper-resistant ledger, entries added to the tamper-resistant ledger between the first point in time and the second point in time 608 — Verify, based on the first proof, the second proof, and the entries added to the ledger between the first point in time and the second point in time, the integrity of the tamper-resistant ledger between the first point in time and the second point in time 610 — Responsive to verifying the integrity of the tamper-resistant ledger, perform an action

INCREMENTAL VERIFICATION OF TAMPER-RESISTANT LEDGER

BACKGROUND

A ledger, which is a log of financial transactions or other data, may be verified to ensure the accuracy, integrity, and consistency of log entries within the ledger. This provides a trustworthy audit trail, prevents fraud, ensures regulatory compliance, and/or enhances the overall reliability of the financial records or other data being managed. Ledger verification plays an important role in financial systems, blockchain networks, and other contexts where maintaining an unalterable and/or transparent ledger is important.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed for incremental verification of a tamper-resistant ledger. Periodic proofs are generated by periodically verifying the integrity of a tamper-resistant ledger. The periodic proofs enable a verifier to incrementally verify the integrity of the tamper-resistant ledger by verifying the periodic proofs. A periodic proof is generated based on a preceding proof and entries added to the tamper-resistant ledger since the preceding proof. A verifier verifies a periodic proof based on the preceding proof and the entries added to the ledger between preceding proof and the proof being verified. An action is performed responsive to verifying the integrity of the tamper-resistant ledger.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 depicts a flowchart of a process for generating a periodic proof to enable incremental verification of a tamper-resistant ledger, in accordance with an embodiment.

FIG. 5 depicts a flowchart of a process for verifying entries in a tamper-resistant ledger, in accordance with an embodiment.

FIG. 6 depicts a flowchart of a process for incrementally verifying a tamper-resistant ledger, in accordance with an embodiment.

Figure 1:
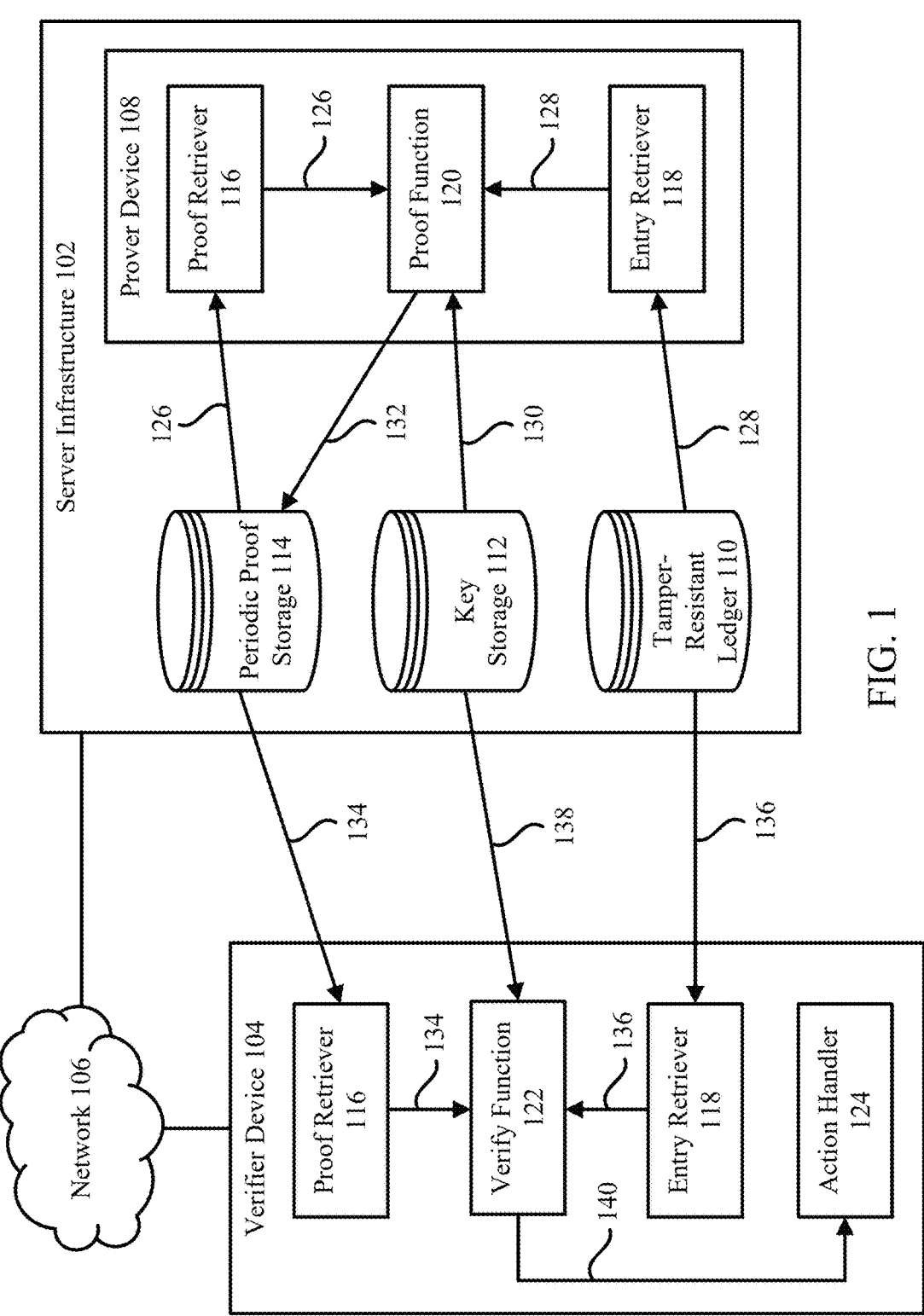
FIG. 1 shows a block diagram of an example system for incrementally verifying a tamper-resistant ledger, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

As used herein, a ledger is a data structure (e.g., a file, a table, an array) that contains a list of events that occur, such as transactions, errors, etc., in a computer system or other environment.

As used herein, the term "zero-knowledge proof" relates to techniques in cryptography by which one party (the prover) can prove to another party (the verifier) that a given statement is true, while avoiding conveying to the verifier any information beyond the mere fact of the statement's truth.

As used herein, the term "trusted party" refers to an individual, organization, or entity that is relied upon to perform tasks correctly and honestly.

As used herein, the term "untrusted party" refers to an individual, organization, or entity that is not assumed to perform tasks honestly and/or correctly. For instance, an untrusted party includes, but is not limited to, a cloud service provider, a publicly accessible server, and/or the like. In embodiments, actions and/or functions described below that are attributed to an untrusted party can also be performed by a trusted party.

As used herein, the term "hash tree" is a binary tree where each leaf node contains a hash, and each non-leaf node contains a hash of the concatenation of its child nodes' hashes. In embodiments, an overall hash value for the hash tree is determined as the value of its top-most root node.

As used herein, the term "hash function" refers to a mathematical function that takes an input and returns a hash value that is a fixed-size string of bytes uniquely representing the input. The term "hash value" refers to a fixed-size string of characters generated by a hash function from an input of arbitrary length that uniquely represents the input.

"Hashing" refers to the application of a hash function to input data to generate an output hash value. In embodiments, hash functions include, but are not limited to, checksums (e.g., cyclic redundancy check (CRC), etc.), universal hash functions (e.g., rolling hash, etc.), non-cryptographic hash functions (e.g., FNV, Murmur, etc.), keyed cryptographic hash functions (e.g., MAC function, etc.), unkeyed cryptographic hash functions (e.g., MD5, SHA-1, SHA-2, etc.), and/or the like.

II. Example Embodiments

Ledger verifiability improves the integrity and transparency of reporting in financial systems, blockchain networks, and other contexts where maintaining an unalterable and/or ledger is important. It helps prevent and detect fraud, ensures compliance with regulatory requirements, and builds trust with stakeholders. Ledger verification ensures that all transactions recorded in the ledger are accurate, authentic, and can be confirmed by an independent party. The computational cost of ledger verification can vary significantly based on numerous factors, such as, but not limited to, the volume and complexity of transactions stored in the ledger, the methods and technologies used for verification, and/or the security measures in place. For instance, advanced technologies like blockchain can provide robust verification mechanisms that often come with significant computational costs.

Embodiments disclosed herein are directed to incremental verification of a ledger by verifying periodic proofs generated by an untrusted party. In embodiments, an untrusted party, such as, but not limited to, a cloud service, a storage provider, and/or the like, periodically generates periodic proofs by executing a ledger verification process that verifies the integrity of an incremental portion of a ledger. For instance, the untrusted party generates a new periodic proof based on a preceding periodic proof and based on computing and checking a hash tree of ledger entries added since a preceding periodic proof. In embodiments, the untrusted party computes the hash value for each ledger entry added since the preceding proof, populates the computed hash values into leaf nodes of a hash tree, and computes a root hash value for the hash tree. The untrusted party, in embodiments, generates the new periodic proof based on the computed root hash value, the preceding proof, and a proving key. In embodiments, verification of a periodic proof guarantees the actual and correct performance of the ledger verification process of an incremental portion of the ledger by the untrusted party. In embodiments, the periodic proofs include, but are not limited to, cryptographic proofs, and/or zero-knowledge proofs. For instance, when implemented as zero-knowledge proofs, the generated periodic proofs are generated without divulging any secrets, such as, but not limited to, cryptographic keys, proving keys, and/or the like.

In embodiments, a verifier incrementally verifies the ledger by sequentially verifying the periodic proofs. For instance, the verifier verifies an initial periodic proof based on ledger entries added to the ledger up to a point in time associated with the initial periodic proof. The verifier, in embodiments, verifies subsequent periodic proofs based on a preceding periodic proof and ledger entries added between a first point in time associated with the preceding periodic proof and a second point in time associated with the periodic proof being verified. In embodiments, the proof verification process performed by the verifier requires less computational resources than the proof generation process performed by the untrusted party. The discrepancy in the computational cost between the proof verification process and the proof generation process reduces the computational requirements of a verifier by offloading, to an untrusted party (e.g., cloud service provider), costly computations, such as, but not limited to, computing a hash tree, computing a verification hash, computing a root hash value for the hash tree, verifying the hash tree, verifying the verification hash, and/or verifying the root hash value. In embodiments, verification of the periodic proofs can be performed by any party interested in verifying the integrity of the ledger, such as, but not limited to, a trusted party, an untrusted party, an interested third-party (e.g., bank, lender, etc.), a regulatory entity, and/or the like.

These and further embodiments enable the functionality described above and additional functionality. Such embodiments are described in further detail as follows.

For example, FIG. 1 shows a block diagram of an example system 100 for incrementally verifying a tamper-resistant ledger, in accordance with an embodiment. As shown in FIG. 1, system 100 includes a server infrastructure 102 and a verifier device 104 that are communicatively coupled via a network 106. Server infrastructure 102 further includes a prover device 108, a tamper-resistant ledger 110, a key storage 112, and a periodic proof storage 114. Prover device 108 further includes a proof retriever 116, an entry retriever 118, and a proof function 120. Verifier device 104 further includes proof retriever 116, entry retriever 118, a verify function 122, and an action handler 124. System 100 is described in further detail as follows.

Server infrastructure 102 comprises a network-accessible server set (e.g., cloud-based environment or platform). In an embodiment, the underlying resources of server infrastructure 102 are co-located (e.g., housed in one or more nearby buildings with associated components such as backup power supplies, redundant data communications, environmental controls, etc.) to form a datacenter, are distributed across different regions, and/or are arranged in other manners. As shown in FIG. 1, server infrastructure 102 comprises prover device 108, tamper-resistant ledger 110, key storage 112, and periodic proof storage 114. Various example implementations of server infrastructure 102 are described below in reference to FIG. 8 (e.g., network-based server infrastructure 870, and/or components thereof).

Verifier device 104 comprises any computing device or plurality of computing devices suitable for performing functions that are ascribed thereto in the following description, as will be appreciated by persons skilled in the relevant art(s), including those mentioned elsewhere herein or otherwise known. Various example implementations of verifier device 104 are described below in reference to FIG. 8 (e.g., computing device 802, network-based server infrastructure 870, on-premises servers 892, and/or components thereof).

Network 106 comprises any computing device or plurality of computing devices suitable for performing functions that are ascribed thereto in the following description, as will be appreciated by persons skilled in the relevant art(s), including those mentioned elsewhere herein or otherwise known. Various example implementations of network 106 are described below in reference to FIG. 8 (e.g., network 804, and/or components thereof).

Prover device 108 comprises any computing device or plurality of computing devices suitable for performing functions that are ascribed thereto in the following description, as will be appreciated by persons skilled in the relevant art(s), including those mentioned elsewhere herein or otherwise known. Various example implementations of prover device 108 are described below in reference to FIG. 8 (e.g., computing device 802, network-based server infrastructure 870, on-premises servers 892, and/or components thereof).

Tamper-resistant ledger 110 comprises an electronic system for recording transactions or data entries in a secure manner. In embodiments, tamper-resistant ledger 110 comprises cryptographic hashes that are computed based on the data entries, and that enable verification of the data entries. Tamper-resistant ledger 110 will be described in greater detail below in conjunction with FIG. 3.

Key storage 112 comprises cryptographic keys, such as, but not limited to, a proving key 130 used by proof function 120 to generate periodic proofs 132, and/or a verification key 138 used by verify function 122 to verify one or more periodic proofs 134. In embodiments, proving key 130 is a private key known only to prover device 108, and verification key 138 is a public key corresponding to proving key 130.

Periodic proof storage 114 stores periodic proofs 132 generated by proof function 120 of prover device 108. In embodiments, periodic proof storage 114 is hosted by a publicly-accessible server to enable any interested party to verify the integrity of tamper-resistant ledger 110 by verifying periodic proofs 134.

Proof retriever 116 is configured to request one or more periodic proofs from periodic proof storage 114. In embodiments, proof retriever 116 of prover device 108 retrieves a preceding periodic proof 126 from periodic proof storage 114, and provides preceding periodic proof 126 to proof function 120 for generating periodic proof 132. In embodiments, proof retriever 116 of verifier device 104 retrieves periodic proof(s) 134 from periodic proof storage 114, and provides periodic proof(s) 134 to verify function 122 for verification.

Entry retriever 118 is configured to request one or more entries from tamper-resistant ledger 110. For instance, entry retriever 118 of prover device 108 retrieves, from tamper-resistant ledger 110, ledger entries 128 added after a point in time associated with preceding periodic proof, and provides the retrieved ledger entries 128 to proof function 120 for verification and proof generation.

Proof function 120 is configured to verify the integrity of ledger entries 128 added to tamper-resistant ledger 110 after a point in time associated with preceding periodic proof 126, and generate periodic proof 132 based on preceding periodic proof 126, verification of the ledger entries 128, and proving key 130.

Verify function 122 is configured to verify a periodic proof 134 based on preceding periodic proof, verification key 138, and ledger entries 136 added to tamper-resistant ledger 110 between a first point in time associated with the preceding periodic proof and a second point in time associated with periodic proof 134. In embodiments, verify function 122 generates verification result 140 based on verification of periodic proof 134. In embodiments, verification result 140 includes, but is not limited to, a Boolean value (e.g., TRUE, FALSE, etc.), a numerical value (e.g., 0, 1, etc.), an alphanumeric value, and/or any combination thereof. In embodiments, verify function 122 provides verification result 140 to action handler 124.

Action handler 124 is configured to perform an action based on verification result 140, such as, but not limited to, generating a report comprising verification result 140, notifying a user that tamper-resistant ledger 110 has failed verification, initiating an audit of tamper-resistant ledger 110, and/or the like.

Figure 2:
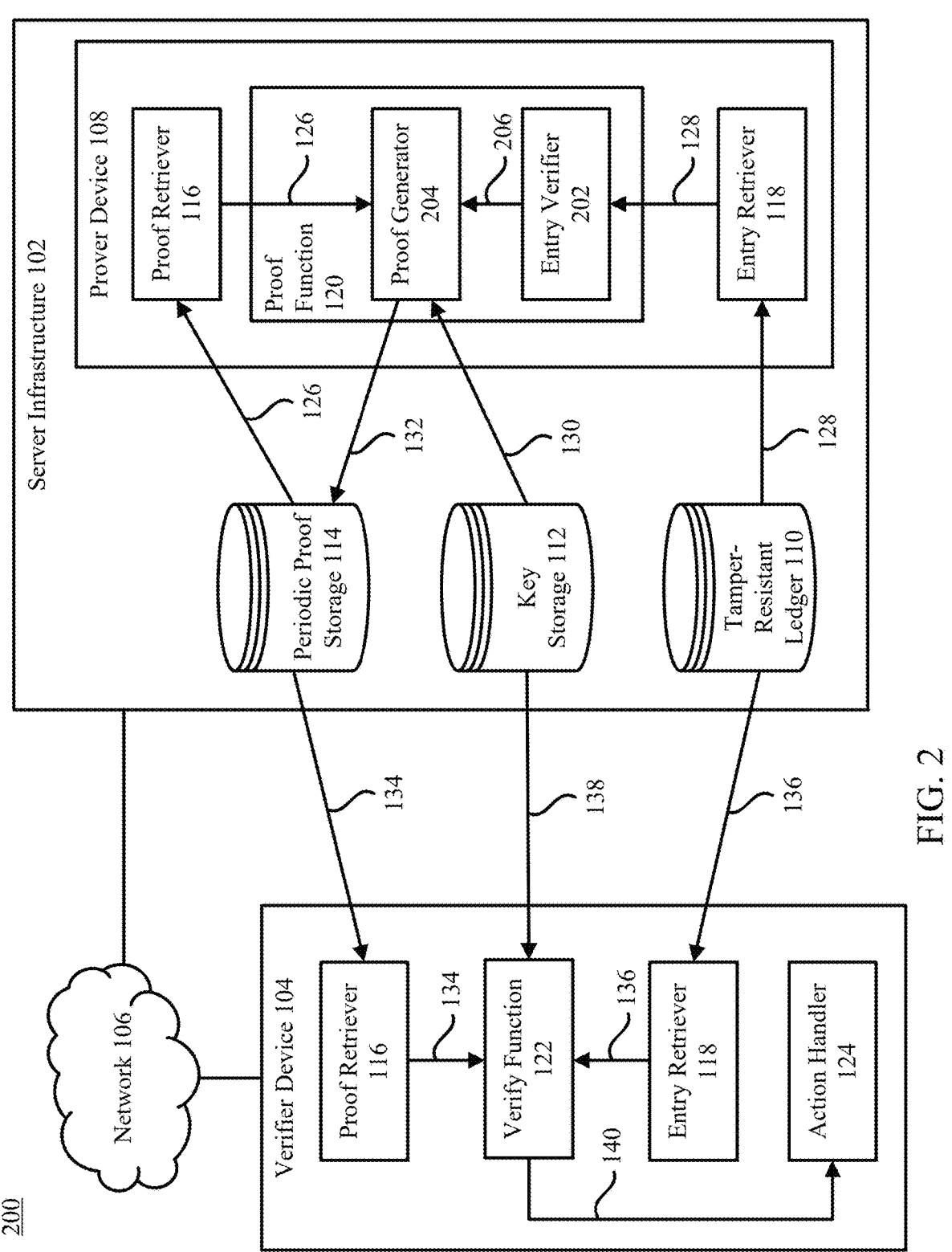
FIG. 2 shows a block diagram of an example system for incrementally verifying a tamper-resistant ledger, in accordance with an embodiment.

Embodiments described herein may operate in various ways to incrementally verify a tamper-resistant ledger. For instance, FIG. 2 shows a block diagram of an example system 200 for incrementally verifying a tamper-resistant ledger, in accordance with an embodiment. As shown in FIG. 2, system 200 includes server infrastructure 102 and verifier device 104 that are communicatively coupled via network 106. Server infrastructure 102 includes prover device 108, tamper-resistant ledger 110, key storage 112, and periodic proof storage 114. Prover device 108 includes proof retriever 116, entry retriever 118, and proof function 120. Verifier device 104 includes proof retriever 116, entry retriever 118, verify function 122, and action handler 124. As shown in FIG. 2, proof function 120 further includes an entry verifier 202, and a proof generator 204. System 200 is described in further detail as follows.

Entry verifier 202 is configured to verify ledger entries 128 added after preceding periodic proof 126 to generate a verification outcome 206, and to provide verification outcome 206 to proof generator 204. In embodiments, entry verifier 202 computes hash values for ledger entries 128 and/or transactions thereof, generates a hash tree with the computed hash values of ledger entries 128 as leaf nodes, and computes verification outcome 206 as the root hash value of the hash tree.

Proof generator 204 is configured to generate periodic proof 132 based on preceding periodic proof 126, proving key 130, and/or verification outcome 206.

Figure 3:
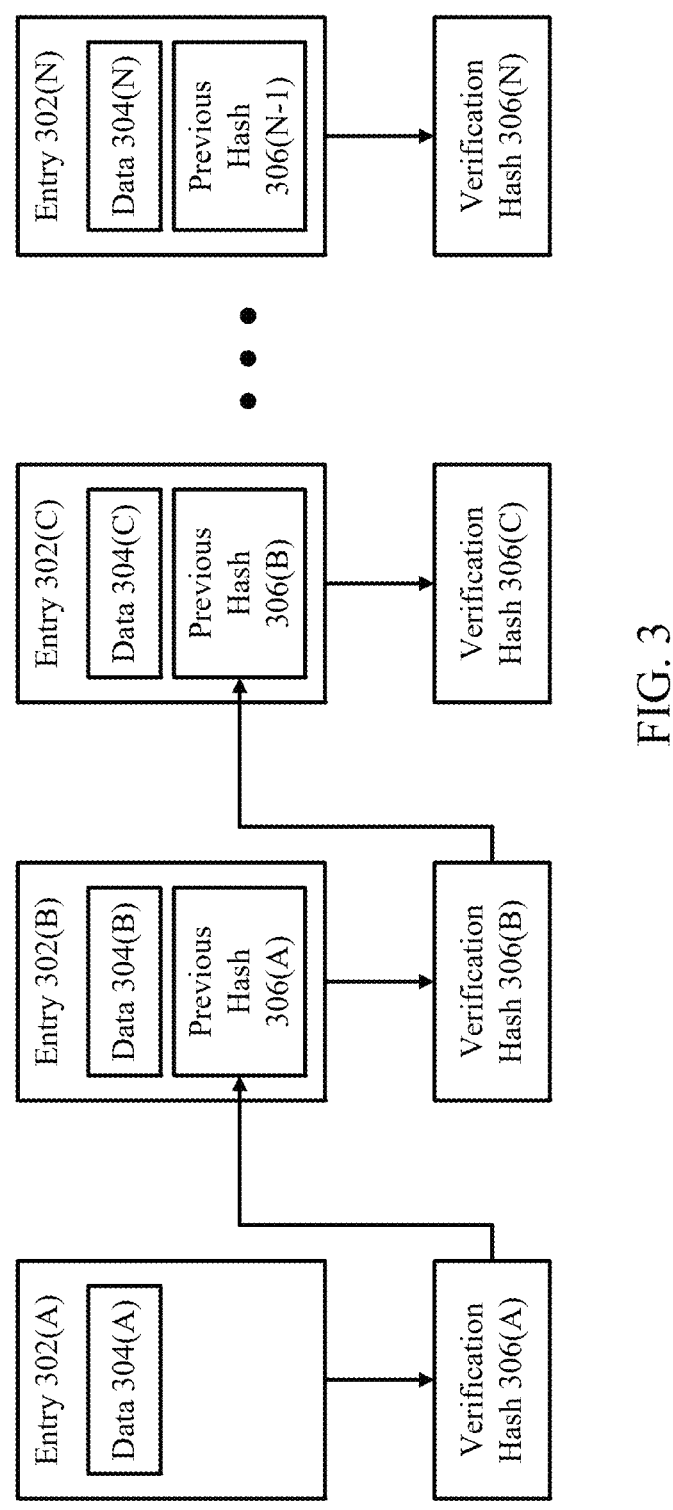
FIG. 3 shows a block diagram of an example tamper-resistant ledger, in accordance with an embodiment.

Embodiments described herein may operate in various ways to maintain a tamper-resistant ledger. For instance, FIG. 3 shows a block diagram of a tamper-resistant ledger 300, in accordance with an embodiment. As shown in FIG. 3, tamper-resistant ledger 300 includes one or more entries 302(A)-302(N) and corresponding verification hashes 306(A)-306(N). In embodiments, tamper-resistant ledger 300 is an example of tamper-resistant ledger 110. Entry 302(A) further includes data 304(A). Entries 302B-302(N) further include data 304B-304(N) and previous hash 306(A)-306(N–1), respectively. Tamper-resistant ledger 300 is described in further detail as follows.

Entry 302(A)-302(N) comprise entries of tamper resistant ledger 300.

Data 304(A)-304(N) comprises entry data of entries 302(A)-302(N), respectively, such as, but not limited to, transaction data, parties of the transaction, transaction amount, a transaction timestamp, a transaction identifier, and/or the like.

Verification hashes 306(A)-306(N) comprises hash values computed based the contents of entries 302(A)-306(N), respectively. For instance, verification hash 306(A) is computed based on data 304(A), and verification hash(es) 306(B)-306(N) are computed based on data 304(B)-304(N) and previous hash(es) 306(A)-306(N–1), respectively.

Previous hashes 306(A)-306(N–1) comprise verification hash(es) 306(A)-306(N–1) associated with preceding entries 302(A)-302(N–1) (not depicted), respectively.

Embodiments described herein may operate in various ways to generate a periodic proof to enable incremental verification of a tamper-resistant ledger. For instance, FIG. 4 depicts a flowchart of a process 400 for generating a periodic proof to enable incremental verification of a tamper-resistant ledger, in accordance with an embodiment. Server infrastructure 102, prover device 108, proof retriever 116, entry retriever, 118, proof function 120, entry verifier 202, and/or proof generator 204 may, for example, operate according to flowchart 400. Note that not all steps of flowchart 400 may need to be performed in all embodiments, and in some embodiments, the steps of flowchart 400 may be performed in different orders than shown. Flowchart 400 is described as follows with respect to FIGS. 1-2 for illustrative purposes.

Flowchart 400 starts at step 402. In step 402, a first proof is obtained, the first proof associated with a verification of the integrity of a tamper-resistant ledger at a first point in time. For instance, proof retriever 116 of prover device 108 obtains preceding periodic proof 126 from periodic proof storage 114. In embodiments, preceding periodic proof 126 is associated with a first point in time, such as, but not limited to, a point in time when preceding periodic proof 126 was generated. In embodiments, preceding periodic proof 126 is a latest and/or last periodic proof stored in periodic proof storage 114. In embodiments, proof retriever 116 of prover device 108 provides preceding periodic proof 126 to proof function 120.

In step 404, at a second point in time occurring after the first point in time, entries added to the tamper-resistant ledger between the first point in time and the second point in time are obtained. For instance, at a second point in time, entry retriever 118 of prover device 108 retrieves, from tamper-resistant ledger 110, ledger entries 128 added to tamper-resistant ledger 110 after the first point in time. In embodiments, entry retriever 118 of prover device 108 provides retrieved ledger entries 128 to proof function 120.

In step 406, a second proof is performed to verify the integrity of the tamper-resistant ledger at the second point in time based on the first proof value and the entries added to the tamper-resistant ledger between the first point in time and the second point in time. For instance, proof generator 204 of proof function 120 generates periodic proof 132 based on preceding periodic proof 126, retrieved ledger entries 128, and/or proving key 130. As will be described in conjunction with FIG. 5 below, proof generator 204, in embodiments, verifies retrieved ledger entries 128 by computing and/or verifying a hash tree based retrieve ledger entries 128.

In step 408, the second proof is provided to a server that maintains periodic proofs associated with periodic verifications of the integrity of the tamper-resistant ledger at periodic points in time. For instance, proof generator 204 of proof function 120 provides periodic proof 132 to periodic proof storage 114.

Embodiments described herein may operate in various ways to verify entries in a tamper-resistant ledger. For instance, FIG. 5 depicts a flowchart of a process 500 for verifying a tamper-resistant log, in accordance with an embodiment. Server infrastructure 102, prover device 108, proof function 120, and/or entry verifier 202 may, for example, operate according to flowchart 500. Note that not all steps of flowchart 500 may need to be performed in all embodiments, and in some embodiments, the steps of flowchart 500 may be performed in different orders than shown. Flowchart 500 is described as follows with respect to FIGS. 1-2 for illustrative purposes.

Flowchart 500 starts at step 502. In step 502, a hash tree is computed for entries added to the tamper-resistant ledger between the first point in time and the second point in time. For instance, entry verifier 202 computes hash values for ledger entries 128 and/or transactions thereof, and generates a hash tree with the computed hash values of ledger entries 128 as leaf nodes.

In step 504, the hash tree is verified. For instance, proof generator 204 computes verification outcome 206 as the root hash value of the computed hash tree.

Embodiments described herein may operate in various ways to incrementally verify a tamper-resistant ledger. For instance, FIG. 6 depicts a flowchart of a process 600 for incrementally verifying a tamper-resistant ledger, in accordance with an embodiment. Verifier device 104, proof retriever 116, entry retriever 118, verify function 122, and/or action handler 124 may, for example, operate according to flowchart 600. Note that not all steps of flowchart 600 may need to be performed in all embodiments, and in some embodiments, the steps of flowchart 600 may be performed in different orders than shown. Flowchart 600 is described as follows with respect to FIGS. 1-2 for illustrative purposes.

Flowchart 600 starts at step 602. In step 602, a first proof is obtained, the first proof associated with a verification of the integrity of a tamper-resistant ledger at a first point in time. For instance, proof retriever 116 of verifier device 104 retrieves, from periodic proof storage 114, a periodic preceding periodic proof 134 to be verified. In embodiments, the periodic proof preceding periodic proof 134 is associated with a first point in time, such as, but not limited to, a point in time when the periodic proof preceding periodic proof 134 was generated. In embodiments, proof retriever 116 of verifier device 104 provides the periodic proof preceding periodic proof 134 to verify function 122.

In step 604, a second proof is obtained, the second proof associated with a verification of the integrity of the tamper-resistant ledger at a second point in time occurring after the first point in time. For instance, proof retriever 116 of verifier device 104 retrieves, from periodic proof storage 114, periodic proof 134 to be verified. In embodiments, periodic proof 134 is associated with a second point in time, such as, but not limited to, a point in time when periodic proof 134 to be verified was generated. In embodiments, proof retriever 116 of verifier device 104 provides periodic proof 134 to verify function 122.

In step 606, entries added to the tamper-resistant ledger between the first point in time and the second point in time are obtained from the tamper-resistant ledger. For instance, entry retriever 118 of verifier device 104 obtains, from tamper-resistant ledger 110, ledger entries 136 added to tamper-resistant ledger 110 between the first point in time associated with the periodic proof preceding periodic proof 134 and the second point in time associated with periodic proof 134. In embodiments, entry retriever 118 of verifier device 104 provides retrieved ledger entries 136 to verify function 122.

In step 608, the integrity of the tamper-resistant ledger between the first point in time and the second point in time is verified based on the first proof, the second proof, and the entries added to the ledger between the first point in time and the second point in time. For instance, verify function 122 verifies periodic proof 134 based on the periodic proof preceding periodic proof 134, ledger entries 136 added to tamper-resistant ledger 110 between the first point in time associated with the periodic proof preceding periodic proof 134 and the second point in time associated with periodic proof 134, and/or verification key 138. In embodiments, verify function 122 generates verification result 140 based on verification of periodic proof 134. In embodiments, verification result 140 includes, but is not limited to, a Boolean value (e.g., TRUE, FALSE, etc.), a numerical value (e.g., 0, 1, etc.), an alphanumeric value, and/or any combination thereof. In embodiments, verify function 122 provides verification result 140 to action handler 124.

In step 610, an action is performed responsive to verifying the integrity of the tamper-resistant ledger. For instance, action handler 124 performs an action based on verification result 140, such as, but not limited to, generating a report comprising verification result 140, notifying a user that tamper-resistant ledger 110 has failed verification, initiating an audit of tamper-resistant ledger 110, and/or the like.

Figure 7:
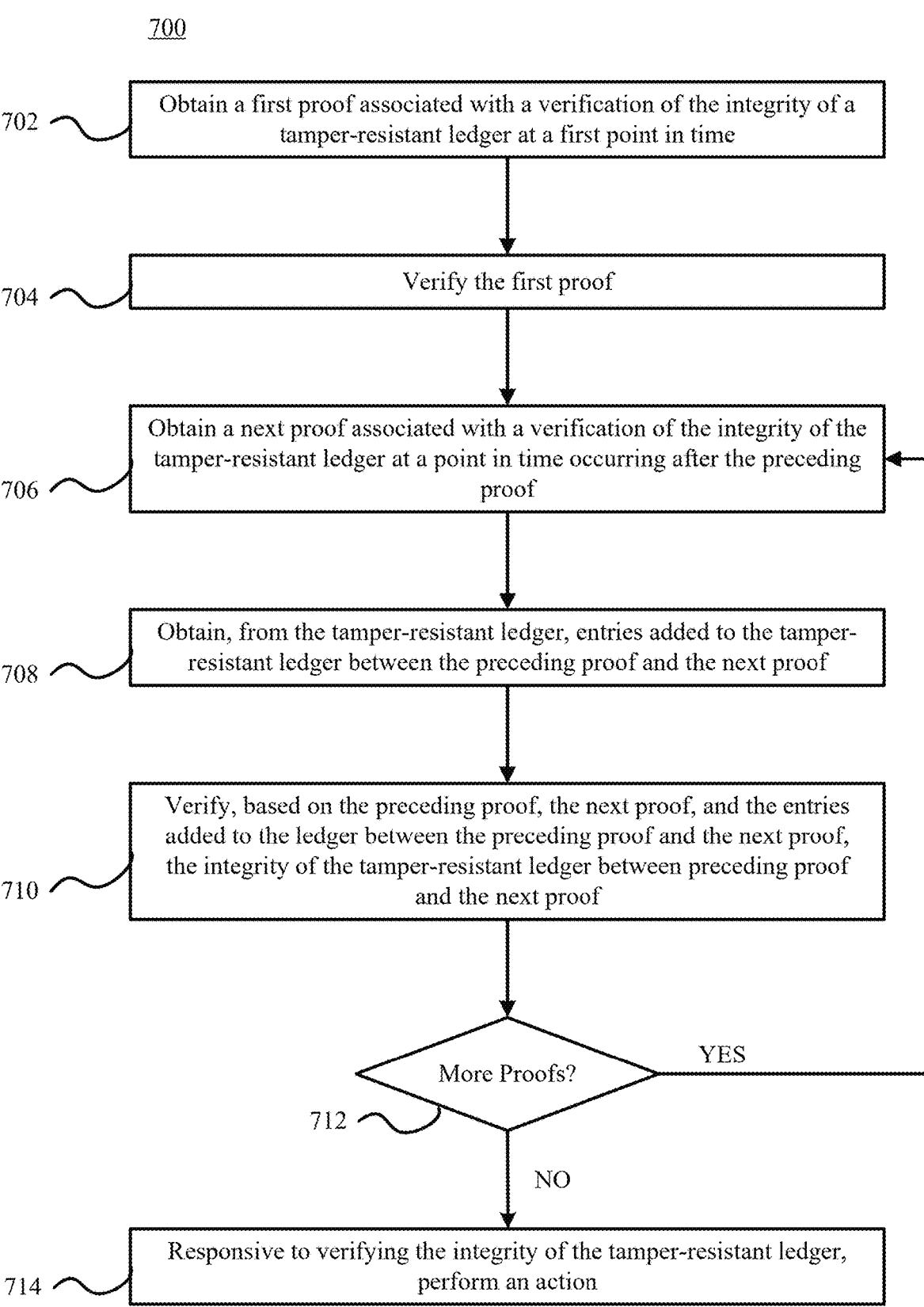
FIG. 7 depicts a flowchart of a process for incrementally verifying a tamper-resistant ledger, in accordance with an embodiment.

Embodiments described herein may operate in various ways to incrementally verify a tamper-resistant ledger. For instance, FIG. 7 depicts a flowchart of a process 700 for incrementally verifying a tamper-resistant ledger, in accordance with an embodiment. Verifier device 104, proof retriever 116, entry retriever 118, verify function 122, and/or action handler 124 may, for example, operate according to flowchart 700. Flowchart 700 is described as follows with respect to FIGS. 1-2 for illustrative purposes.

Flowchart 700 starts at step 702. In step 702, a first proof is obtained, the first proof associated with a verification of the integrity of a tamper-resistant ledger at a first point in time. For instance, proof retriever 116 of verifier device 104 retrieves, from periodic proof storage 114, an initial periodic proof 134. In embodiments, proof retriever 116 of verifier device 104 provides initial periodic proof 134 to verify function 122.

In step 704, the first proof is verified. For instance, verify function 122 verifies the initial periodic proof 134 based ledger entries 136 added to tamper-resistant ledger 110 up to a point in time associated with initial periodic proof 134, and/or verification key 138.

In step 706, a next proof is obtained, the next proof associated with a verification of the integrity of the tamper-resistant ledger at a point in time occurring after a preceding proof. For instance, proof retriever 116 of verifier device 104 retrieves, from periodic proof storage 114, a subsequent periodic proof 134 subsequent to initial periodic proof 134. In embodiments, proof retriever 116 of verifier device 104 provides subsequent periodic proof 134 to verify function 122.

In step 708, entries added to the tamper-resistant ledger between the preceding proof and the next proof are obtained from the tamper-resistant ledger. For instance, entry retriever 118 of verifier device 104 obtains, from tamper-resistant ledger 110, ledger entries 136 added to tamper-resistant ledger 110 between a point in time associated with initial periodic proof 134 and the point in time associated with subsequent periodic proof 134. In embodiments, entry retriever 118 of verifier device 104 provides retrieved ledger entries 136 to verify function 122.

In step 710, the integrity of the tamper-resistant ledger between preceding proof and the next proof is verified based on the preceding proof, the next proof, and the entries added to the ledger between the preceding proof and the next proof. For instance, verify function 122 verifies subsequent periodic proof 134 based on initial periodic proof 134, ledger entries 136 added to tamper-resistant ledger 110 between a point in time associated with initial periodic proof 134 and the point in time associated with subsequent periodic proof 134, and/or verification key 138. In embodiments, verify function 122 generates verification result 140 based on verification of periodic proof 134. In embodiments, verification result 140 includes, but is not limited to, a Boolean value (e.g., TRUE, FALSE, etc.), a numerical value (e.g., 0, 1, etc.), an alphanumeric value, and/or any combination thereof. In embodiments, verify function 122 provides verification result 140 to action handler 124.

In step 712, it is determined whether more proofs exist. In embodiments, verifier device 104 determines whether an additional subsequent periodic proof exists in tamper-resistant ledger 110. If an additional subsequent periodic proof exist, flowchart 700 returns to step 706 and obtains the additional subsequent periodic proof from periodic proof storage 114, otherwise, flowchart 700 proceeds to step 714.

In step 714, an action is performed responsive to verifying the integrity of the tamper-resistant ledger. For instance, action handler 124 performs an action based on verification result 140, such as, but not limited to, generating a report comprising verification result 140, notifying a user that tamper-resistant ledger 110 has failed verification, initiating an audit of tamper-resistant ledger 110, and/or the like.

III. Example Mobile Device and Computer System Implementation

Server infrastructure 102, verifier device 104, network 106, prover device 108, tamper-resistant ledger 110, key storage 112, periodic proof storage 114, proof retriever 116, entry retriever 118, proof function 120, verify function 122, action handler 124, entry verifier 202, proof generator 204, entries 302(A)-302(N), data 304(A)-304(N), verification hashes 306(A)-306(N), previous hashes 306(A)-306(N−1), and/or the components described therein and/or the steps of flowcharts 400, 500, 600, and/or 700 are implemented in hardware, or hardware combined with one or both of software and/or firmware. For example, server infrastructure 102, verifier device 104, network 106, prover device 108, tamper-resistant ledger 110, key storage 112, periodic proof storage 114, proof retriever 116, entry retriever 118, proof function 120, verify function 122, action handler 124, entry verifier 202, proof generator 204, entries 302(A)-302(N), data 304(A)-304(N), verification hashes 306(A)-306(N), previous hashes 306(A)-306(N−1), and/or the components described therein, and/or the steps of flowcharts 400, 500, 600, and/or 700 are each implemented as computer program code/instructions configured to be executed in one or more processors and stored in a computer readable storage medium. Alternatively, server infrastructure 102, verifier device 104, network 106, prover device 108, tamper-resistant ledger 110, key storage 112, periodic proof storage 114, proof retriever 116, entry retriever 118, proof function 120, verify function 122, action handler 124, entry verifier 202, proof generator 204, entries 302(A)-302(N), data 304(A)-304(N), verification hashes 306(A)-306(N), previous hashes 306(A)-306(N−1), and/or the components described therein, and/or the steps of flowcharts 400, 500, 600, and/or 700 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 8:
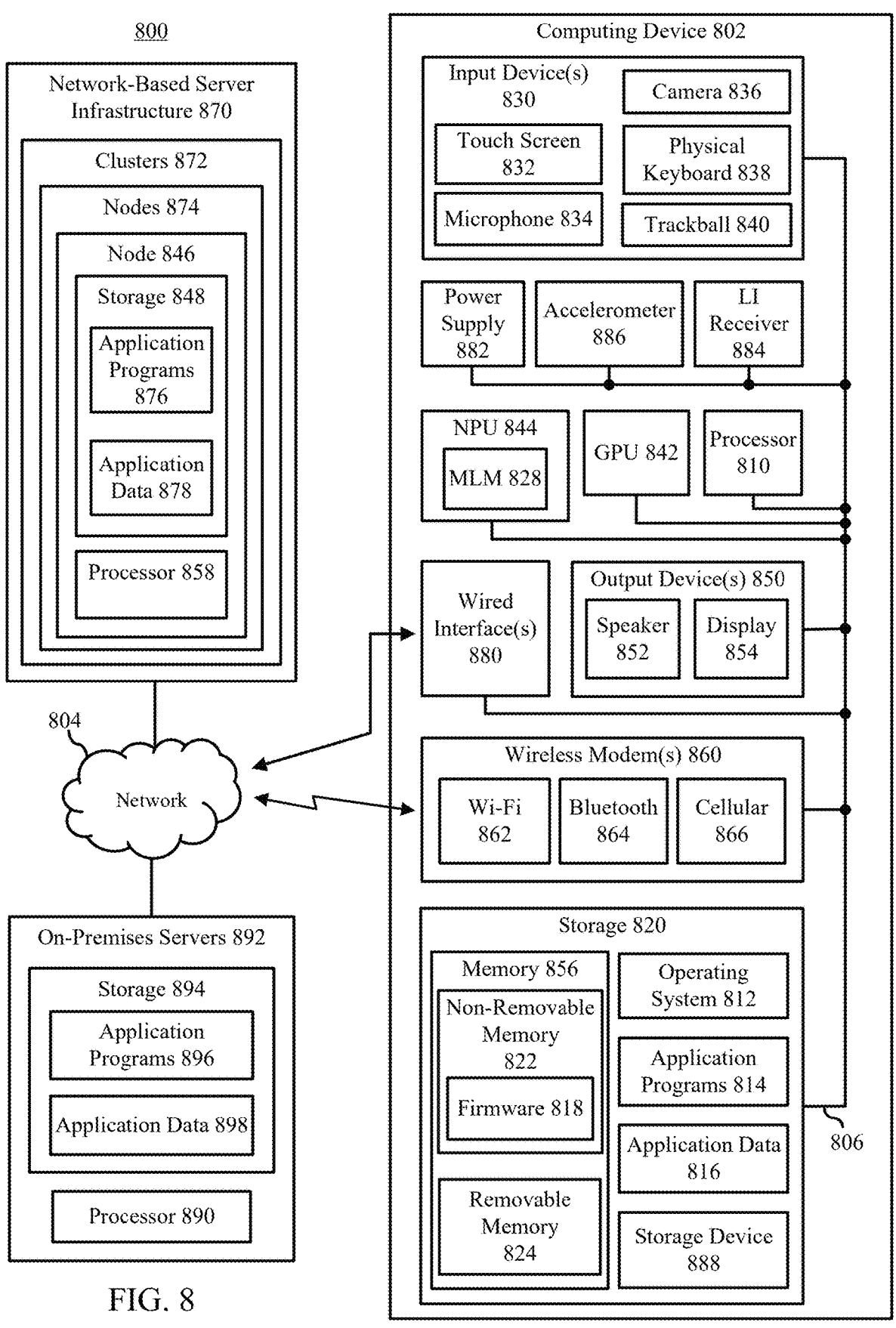
FIG. 8 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 8. FIG. 8 shows a block diagram of an exemplary computing environment 800 that includes a computing device 802. Computing device 802 is an example of server infrastructure 102, verifier device 104, and/or prover device 108, which each include one or more of the components of computing device 802. In some embodiments, computing device 802 is communicatively coupled with devices (not shown in FIG. 8) external to computing environment 800 via network 804. Network 804 comprises one or more networks such as local area networks (LANs), wide area networks (WANs), enterprise networks, the Internet, etc. In examples, network 804 includes one or more wired and/or wireless portions. In some examples, network 804 additionally or alternatively includes a cellular network for cellular communications. Computing device 802 is described in detail as follows.

Computing device 802 can be any of a variety of types of computing devices. Examples of computing device 802 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 802 is a stationary computing device such as a desktop computer, a personal computer (PC), a stationary server device, a minicomputer, a mainframe, a supercomputer, etc.

As shown in FIG. 8, computing device 802 includes a variety of hardware and software components, including a processor 810, a storage 820, a graphics processing unit (GPU) 842, a neural processing unit (NPU) 844, one or more input devices 830, one or more output devices 850, one or more wireless modems 860, one or more wired interfaces 880, a power supply 882, a location information (LI) receiver 884, and an accelerometer 886. Storage 820 includes memory 856, which includes non-removable memory 822 and removable memory 824, and a storage device 888. Storage 820 also stores an operating system 812, application programs 814, and application data 816. Wireless modem(s) 860 include a Wi-Fi modem 862, a Bluetooth modem 864, and a cellular modem 866. Output device(s) 850 includes a speaker 852 and a display 854. Input device(s) 830 includes a touch screen 832, a microphone 834, a camera 836, a physical keyboard 838, and a trackball 840. Not all components of computing device 802 shown in FIG. 8 are present in all embodiments, additional components not shown may be present, and in a particular embodiment any combination of the components are present. In examples, components of computing device 802 are mounted to a circuit card (e.g., a motherboard) of computing device 802, integrated in a housing of computing device 802, or otherwise included in computing device 802. The components of computing device 802 are described as follows.

In embodiments, a single processor 810 (e.g., central processing unit (CPU), microcontroller, a microprocessor, signal processor, ASIC (application specific integrated circuit), and/or other physical hardware processor circuit) or multiple processors 810 are present in computing device 802 for performing such tasks as program execution, signal coding, data processing, input/output processing, power control, and/or other functions. In examples, processor 810 is a single-core or multi-core processor, and each processor core is single-threaded or multithreaded (to provide multiple threads of execution concurrently). Processor 810 is configured to execute program code stored in a computer readable medium, such as program code of operating system 812 and application programs 814 stored in storage 820. The program code is structured to cause processor 810 to perform operations, including the processes/methods disclosed herein. Operating system 812 controls the allocation and usage of the components of computing device 802 and provides support for one or more application programs 814

(also referred to as "applications" or "apps"). In examples, application programs 814 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 810 includes one or more general processors (e.g., CPUs) configured with or coupled to one or more hardware accelerators, such as one or more NPUs 844 and/or one or more GPUs 842.

Any component in computing device 802 can communicate with any other component according to function, although not all connections are shown for case of illustration. For instance, as shown in FIG. 8, bus 806 is a multiple signal line communication medium (e.g., conductive traces in silicon, metal traces along a motherboard, wires, etc.) present to communicatively couple processor 810 to various other components of computing device 802, although in other embodiments, an alternative bus, further buses, and/or one or more individual signal lines is/are present to communicatively couple components. Bus 806 represents one or more of any of several types of bus structures, including a memory bus or memory controller, a peripheral bus, an accelerated graphics port, and a processor or local bus using any of a variety of bus architectures.

Storage 820 is physical storage that includes one or both of memory 856 and storage device 888, which store operating system 812, application programs 814, and application data 816 according to any distribution. Non-removable memory 822 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 822 includes main memory and is separate from or fabricated in a same integrated circuit as processor 810. As shown in FIG. 8, non-removable memory 822 stores firmware 818 that is present to provide low-level control of hardware. Examples of firmware 818 include BIOS (Basic Input/Output System, such as on personal computers) and boot firmware (e.g., on smart phones). In examples, removable memory 824 is inserted into a receptacle of or is otherwise coupled to computing device 802 and can be removed by a user from computing device 802. Removable memory 824 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 888 are present that are internal and/or external to a housing of computing device 802 and are or are not removable. Examples of storage device 888 include a hard disk drive, a SSD, a thumb drive (e.g., a USB (Universal Serial Bus) flash drive), or other physical storage device.

One or more programs are stored in storage 820. Such programs include operating system 812, one or more application programs 814, and other program modules and program data. Examples of such application programs include computer program logic (e.g., computer program code/ instructions) for implementing server infrastructure 102, verifier device 104, network 106, prover device 108, tamper-resistant ledger 110, key storage 112, periodic proof storage 114, proof retriever 116, entry retriever 118, proof function 120, verify function 122, action handler 124, entry verifier 202, proof generator 204, entries 302(A)-302(N), data 304 (A)-304(N), verification hashes 306(A)-306(N), previous hashes 306(A)-306(N−1), and/or each of the components described therein, as well as any of flowcharts 400, 500, 600, 700, and/or any individual steps thereof.

Storage 820 also stores data used and/or generated by operating system 812 and application programs 814 as application data 816. Examples of application data 816 include web pages, text, images, tables, sound files, video data, and other data. In examples, application data 816 is sent to and/or received from one or more network servers or other devices via one or more wired or wireless networks. Storage 820 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 802 through one or more input devices 830 and receives information from computing device 802 through one or more output devices 850. Input device(s) 830 includes one or more of touch screen 832, microphone 834, camera 836, physical keyboard 838 and/or trackball 840 and output device(s) 850 includes one or more of speaker 852 and display 854. Each of input device(s) 830 and output device(s) 850 are integral to computing device 802 (e.g., built into a housing of computing device 802) or are external to computing device 802 (e.g., communicatively coupled wired or wirelessly to computing device 802 via wired interface(s) 880 and/or wireless modem(s) 860). Further input devices 830 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 854 displays information, as well as operating as touch screen 832 by receiving user commands and/or other information (e.g., by touch, finger gestures, virtual keyboard, etc.) as a user interface. Any number of each type of input device(s) 830 and output device(s) 850 are present, including multiple microphones 834, multiple cameras 836, multiple speakers 852, and/or multiple displays 854.

In embodiments where GPU 842 is present, GPU 842 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 842 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 844 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 828. In an example, NPU 844 is configured for a data-driven parallel computing and is highly efficient at processing massive multimedia data such as videos and images and processing data for neural networks. NPU 844 is configured for efficient handling of AI-related tasks, such as speech recognition, background blurring in video calls, photo or video editing processes like object detection, etc.

In embodiments disclosed herein that implement ML models, NPU 844 can be utilized to execute such ML models, of which MLM 828 is an example. For instance, where applicable, MLM 828 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 844 is used to train MLM 828. To train MLM 828, training data is that includes input features (attributes) and their corresponding output labels/target values (e.g., for supervised learning) is collected. A training algorithm is a computational procedure that is used so that MLM 828 learns from the training data. Parameters/weights are internal settings of MLM 828 that are adjusted during training by the training algorithm to reduce a difference between predictions by MLM 828 and actual outcomes (e.g., output labels). In some examples, MLM 828 is set with initial values for the parameters/weights. A loss function measures a dissimilarity between predictions by MLM 828 and the target values, and the parameters/weights of MLM 828 are adjusted to minimize the loss function. The parameters/weights are iteratively adjusted by an optimization technique, such as gradient descent. In this manner, MLM 828 is generated through training by NPU 844 to be used to generate inferences based on received input feature sets for particular applications. MLM 828 is generated as a computer program or other type of algorithm configured to generate an output (e.g., a classification, a prediction/inference) based on received input features, and is stored in the form of a file or other data structure.

In examples, such training of MLM 828 by NPU 844 is supervised or unsupervised. According to supervised learning, input objects (e.g., a vector of predictor variables) and a desired output value (e.g., a human-labeled supervisory signal) train MLM 828. The training data is processed, building a function that maps new data on expected output values. Example algorithms usable by NPU 844 to perform supervised training of MLM 828 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 828 is an LLM, MLM 828 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 828 is trained to learn patterns from unlabeled data. For instance, in embodiments where MLM 828 implements unsupervised learning techniques, MLM 828 identifies one or more classifications or clusters to which an input belongs. During a training phase of MLM 828 according to unsupervised learning, MLM 828 tries to mimic the provided training data and uses the error in its mimicked output to correct itself (i.e., correct weights and biases). In further examples, NPU 844 perform unsupervised training of MLM 828 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and back-propagating reconstruction errors or hidden state reparameterizations.

Note that NPU 844 need not necessarily be present in all ML model embodiments. In embodiments where ML models are present, any one or more of processor 810, GPU 842, and/or NPU 844 can be present to train and/or execute MLM 828.

One or more wireless modems 860 can be coupled to antenna(s) (not shown) of computing device 802 and can support two-way communications between processor 810 and devices external to computing device 802 through network 804, as would be understood to persons skilled in the relevant art(s). Wireless modem 860 is shown generically and can include a cellular modem 866 for communicating with one or more cellular networks, such as a GSM network for data and voice communications within a single cellular network, between cellular networks, or between the mobile device and a public switched telephone network (PSTN). In examples, wireless modem 860 also or alternatively includes other radio-based modem types, such as a Bluetooth modem 864 (also referred to as a "Bluetooth device") and/or Wi-Fi modem 862 (also referred to as an "wireless adaptor"). Wi-Fi modem 862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 802 can further include power supply 882, LI receiver 884, accelerometer 886, and/or one or more wired interfaces 880. Example wired interfaces 880 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 880 of computing device 802 provide for wired connections between computing device 802 and network 804, or between computing device 802 and one or more devices/peripherals when such devices/peripherals are external to computing device 802 (e.g., a pointing device, display 854, speaker 852, camera 836, physical keyboard 838, etc.). Power supply 882 is configured to supply power to each of the components of computing device 802 and receives power from a battery internal to computing device 802, and/or from a power cord plugged into a power port of computing device 802 (e.g., a USB port, an A/C power port). LI receiver 884 is useable for location determination of computing device 802 and in examples includes a satellite navigation receiver such as a Global Positioning System (GPS) receiver and/or includes other type of location determiner configured to determine location of computing device 802 based on received information (e.g., using cell tower triangulation, etc.). Accelerometer 886, when present, is configured to determine an orientation of computing device 802.

Note that the illustrated components of computing device 802 are not required or all-inclusive, and fewer or greater numbers of components can be present as would be recognized by one skilled in the art. In examples, computing device 802 includes one or more of a gyroscope, barometer, proximity sensor, ambient light sensor, digital compass, etc. In an example, processor 810 and memory 856 are co-located in a same semiconductor device package, such as being included together in an integrated circuit chip, FPGA, or system-on-chip (SOC), optionally along with further components of computing device 802.

In embodiments, computing device 802 is configured to implement any of the above-described features of flowcharts herein. Computer program logic for performing any of the operations, steps, and/or functions described herein is stored in storage 820 and executed by processor 810.

In some embodiments, server infrastructure 870 is present in computing environment 800 and is communicatively coupled with computing device 802 via network 804. Server infrastructure 870, when present, is a network-accessible server set (e.g., a cloud-based environment or platform). As shown in FIG. 8, server infrastructure 870 includes clusters 872. Each of clusters 872 comprises a group of one or more compute nodes and/or a group of one or more storage nodes. For example, as shown in FIG. 8, cluster 872 includes nodes 874. Each of nodes 874 are accessible via network 804 (e.g., in a "cloud-based" embodiment) to build, deploy, and manage applications and services. In examples, any of nodes 874 is a storage node that comprises a plurality of physical storage disks, SSDs, and/or other physical storage devices that are accessible via network 804 and are configured to store data associated with the applications and services managed by nodes 874.

Each of nodes 874, as a compute node, comprises one or more server computers, server systems, and/or computing devices. For instance, a node 874 in accordance with an embodiment includes one or more of the components of computing device 802 disclosed herein. Each of nodes 874 is configured to execute one or more software applications (or "applications") and/or services and/or manage hardware resources (e.g., processors, memory, etc.), which are utilized by users (e.g., customers) of the network-accessible server set. In examples, as shown in FIG. 8, nodes 874 includes a node 846 that includes storage 848 and/or one or more of a processor 858 (e.g., similar to processor 810, GPU 842, and/or NPU 844 of computing device 802). Storage 848 stores application programs 876 and application data 878. Processor(s) 858 operate application programs 876 which access and/or generate related application data 878. In an implementation, nodes such as node 846 of nodes 874 operate or comprise one or more virtual machines, with each virtual machine emulating a system architecture (e.g., an operating system), in an isolated manner, upon which applications such as application programs 876 are executed.

In embodiments, one or more of clusters 872 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 872 are included in a datacenter in a distributed collection of datacenters. In embodiments, exemplary computing environment 800 comprises part of a cloud-based platform.

In an embodiment, computing device 802 accesses application programs 876 for execution in any manner, such as by a client application and/or a browser at computing device 802.

In an example, for purposes of network (e.g., cloud) backup and data security, computing device 802 additionally and/or alternatively synchronizes copies of application programs 814 and/or application data 816 to be stored at network-based server infrastructure 870 as application programs 876 and/or application data 878. In examples, operating system 812 and/or application programs 814 include a file hosting service client configured to synchronize applications and/or data stored in storage 820 at network-based server infrastructure 870.

In some embodiments, on-premises servers 892 are present in computing environment 800 and are communicatively coupled with computing device 802 via network 804. On-premises servers 892, when present, are hosted within an organization's infrastructure and, in many cases, physically onsite of a facility of that organization. On-premises servers 892 are controlled, administered, and maintained by IT (Information Technology) personnel of the organization or an IT partner to the organization. Application data 898 can be shared by on-premises servers 892 between computing devices of the organization, including computing device 802 (when part of an organization) through a local network of the organization, and/or through further networks accessible to the organization (including the Internet). Furthermore, in examples, on-premises servers 892 serve applications such as application programs 896 to the computing devices of the organization, including computing device 802. Accordingly, in examples, on-premises servers 892 include storage 894

(which includes one or more physical storage devices such as storage disks and/or SSDs) for storage of application programs 896 and application data 898 and include a processor 890 (e.g., similar to processor 810, GPU 842, and/or NPU 844 of computing device 802) for execution of application programs 896. In some embodiments, multiple processors 890 are present for execution of application programs 896 and/or for other purposes. In further examples, computing device 802 is configured to synchronize copies of application programs 814 and/or application data 816 for backup storage at on-premises servers 892 as application programs 896 and/or application data 898.

Embodiments described herein may be implemented in one or more of computing device 802, network-based server infrastructure 870, and on-premises servers 892. For example, in some embodiments, computing device 802 is used to implement systems, clients, or devices, or components/subcomponents thereof, disclosed elsewhere herein. In other embodiments, a combination of computing device 802, network-based server infrastructure 870, and/or on-premises servers 892 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 820. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 814) are stored in storage 820. Such computer programs can also be received via wired interface(s) 860 and/or wireless modem(s) 860 over network 804. Such computer programs, when executed or loaded by an application, enable computing device 802 to implement features of embodiments discussed herein. Accordingly, such computer programs represent controllers of the computing device 802.

Embodiments are also directed to computer program products comprising computer code or instructions stored on any computer-readable medium or computer-readable storage medium. Such computer program products include the physical storage of storage 820 as well as further physical storage types.

IV. Additional Example Embodiments

In embodiments, a method comprises: obtaining a first proof associated with a verification of the integrity of a tamper-resistant ledger at a first point in time; obtaining, at a second point in time occurring after the first point in time, entries added to the tamper-resistant ledger between the first point in time and the second point in time; performing, based on the first proof value and the entries added to the tamper-resistant ledger between the first point in time and the second point in time, a second proof to verify the integrity of the tamper-resistant ledger at the second point in time; and providing the second proof to a server that maintains periodic proofs associated with periodic verifications of the integrity of the tamper-resistant ledger at periodic points in time, the periodic proofs enabling a verifier to incrementally verify the integrity of the tamper-resistant ledger by incrementally verifying the periodic proofs.

In embodiments, performing, based on the first proof value and the entries added to the tamper-resistant ledger between the first point in time and the second point in time, a second proof to verify the integrity of the tamper-resistant ledger at the second point in time comprises: computing a hash tree for entries added to the tamper-resistant ledger between the first point in time and the second point in time; and verifying the hash tree.

In embodiments, the method further comprises: obtaining, from the server, the first proof and the second proof; obtaining, from the tamper-resistant ledger, entries added to the tamper-resistant ledger between the first point in time and the second point in time; verifying, based on the first proof, the second proof, and the entries added to the ledger between the first point in time and the second point in time, the integrity of the tamper-resistant ledger between the first point in time and the second point in time; and responsive to verifying the integrity of the tamper-resistant ledger, performing an action.

In embodiments, performing an action comprises: obtaining a third proof associated with a verification of the integrity the tamper-resistant ledger at a third point in time occurring after the second point in time; obtaining, from the tamper-resistant ledger, entries added to the ledger between the second point in time and the third point in time; and verifying, based on the second proof, the third proof, and the entries added to the ledger between the second point in time and the third point in time, the integrity of the tamper-resistant ledger between the second point in time and the third point in time.

In embodiments, performing an action comprises at least one of: generating a report comprising a result of verifying the integrity of the tamper-resistant ledger, notifying a user that the tamper-resistant ledger has failed verification; or initiating an audit of the tamper-resistant ledger.

In embodiments, the server comprises a publicly-accessible server that provides the periodic proofs to any entity interested in verifying the integrity of the tamper-resistant ledger.

In embodiments, at least one of the first proof or the second proof comprise at least one of: a cryptographic proof; or a zero-knowledge proof.

In embodiments, a system comprises: a processor; and a memory device that stores program code structured to cause the processor to: obtain a first proof associated with a verification of the integrity of a tamper-resistant ledger at a first point in time; obtain, at a second point in time occurring after the first point in time, entries added to the tamper-resistant ledger between the first point in time and the second point in time; perform, based on the first proof value and the entries added to the tamper-resistant ledger between the first point in time and the second point in time, a second proof to verify the integrity of the tamper-resistant ledger at the second point in time; and provide the second proof to a server that maintains periodic proofs associated with periodic verifications of the integrity of the tamper-resistant ledger at periodic points in time, the periodic proofs enabling a verifier to incrementally verify the integrity of the tamper-resistant ledger by incrementally verifying the periodic proofs.

In embodiments, to perform, based on the first proof value and the entries added to the tamper-resistant ledger between the first point in time and the second point in time, a second proof to verify the integrity of the tamper-resistant ledger at the second point in time, the program code is structured to cause the processor to: compute a hash tree for entries added to the tamper-resistant ledger between the first point in time and the second point in time; and verify the hash tree.

In embodiments, the program code is structured to cause the processor to: obtain, from the server, the first proof and the second proof; obtain, from the tamper-resistant ledger, entries added to the tamper-resistant ledger between the first point in time and the second point in time; verify, based on the first proof, the second proof, and the entries added to the ledger between the first point in time and the second point in time, the integrity of the tamper-resistant ledger between the first point in time and the second point in time; and responsive to verifying the integrity of the tamper-resistant ledger, perform an action.

In embodiments, to perform an action, the program code is structured to cause the processor to: obtain a third proof associated with a verification of the integrity the tamper-resistant ledger at a third point in time occurring after the second point in time; obtain, from the tamper-resistant ledger, entries added to the ledger between the second point in time and the third point in time; and verify, based on the second proof, the third proof, and the entries added to the ledger between the second point in time and the third point in time, the integrity of the tamper-resistant ledger between the second point in time and the third point in time.

In embodiments, to perform an action, the program code is structured to cause the processor to perform at least one of: generate a report comprising a result of verifying the integrity of the tamper-resistant ledger, notify a user that the tamper-resistant ledger has failed verification; or initiate an audit of the tamper-resistant ledger.

In embodiments, the server comprises a publicly-accessible server that provides the periodic proofs to any entity interested in verifying the integrity of the tamper-resistant ledger.

In embodiments, at least one of the first proof or the second proof comprise at least one of: a cryptographic proof; or a zero-knowledge proof.

In embodiments, a computer-readable storage medium comprising executable instructions that, when executed by a processor, cause the processor to: obtain a first proof associated with a verification of the integrity of a tamper-resistant ledger at a first point in time; obtain a second proof associated with a verification of the integrity of the tamper-resistant ledger at a second point in time occurring after the first point in time; obtain, from the tamper-resistant ledger, entries added to the tamper-resistant ledger between the first point in time and the second point in time; verify, based on the first proof, the second proof, and the entries added to the ledger between the first point in time and the second point in time, the integrity of the tamper-resistant ledger between the first point in time and the second point in time; and responsive to verifying the integrity of the tamper-resistant ledger, perform an action.

In embodiments, to perform an action, the executable instructions, when executed by the processor, cause the processor to: obtain a third proof associated with a verification of the integrity the tamper-resistant ledger at a third point in time occurring after the second point in time; obtain, from the tamper-resistant ledger, entries added to the ledger between the second point in time and the third point in time; and verify, based on the second proof, the third proof, and the entries added to the ledger between the second point in time and the third point in time, the integrity of the tamper-resistant ledger between the second point in time and the third point in time.

In embodiments, to perform an action, the executable instructions, when executed by the processor, cause the processor to perform at least one of: generate a report comprising a result of verifying the integrity of the tamper-resistant ledger, notify a user that the tamper-resistant ledger has failed verification; or initiate an audit of the tamper-resistant ledger.

In embodiments, to obtain the first proof, the executable instructions, when executed by the processor, cause the processor to: request the first proof from a server that maintains periodic proofs associated with periodic verifications of the integrity of the tamper-resistant ledger at periodic points in time; and receive, from the server, the first proof.

In embodiments, the server comprises a publicly-accessible server that provides the periodic proofs to any entity interested in verifying the integrity of the tamper-resistant ledger.

In embodiments, at least one of the first proof or the second proof comprises at least one of: a cryptographic proof; or a zero-knowledge proof.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:
obtaining a first proof associated with a verification of the integrity of a tamper-resistant ledger at a first point in time;
obtaining, at a second point in time occurring after the first point in time, entries added to the tamper-resistant ledger between the first point in time and the second point in time;
performing, based on the first proof value and the entries added to the tamper-resistant ledger between the first point in time and the second point in time, a second proof to verify the integrity of the tamper-resistant ledger at the second point in time; and
providing the second proof to a server that maintains periodic proofs associated with periodic verifications of the integrity of the tamper-resistant ledger at periodic points in time, the periodic proofs enabling a verifier to incrementally verify the integrity of the tamper-resistant ledger by incrementally verifying the periodic proofs.

2. The method of claim 1, wherein said performing, based on the first proof value and the entries added to the tamper-resistant ledger between the first point in time and the second point in time, a second proof to verify the integrity of the tamper-resistant ledger at the second point in time comprises:
computing a hash tree for entries added to the tamper-resistant ledger between the first point in time and the second point in time; and
verifying the hash tree.

3. The method of claim 1, further comprising:
obtaining, from the server, the first proof and the second proof;
obtaining, from the tamper-resistant ledger, entries added to the tamper-resistant ledger between the first point in time and the second point in time;
verifying, based on the first proof, the second proof, and the entries added to the ledger between the first point in time and the second point in time, the integrity of the tamper-resistant ledger between the first point in time and the second point in time; and
responsive to verifying the integrity of the tamper-resistant ledger, performing an action.

4. The method of claim 3, wherein said performing an action comprises:
obtaining a third proof associated with a verification of the integrity the tamper-resistant ledger at a third point in time occurring after the second point in time;
obtaining, from the tamper-resistant ledger, entries added to the ledger between the second point in time and the third point in time; and
verifying, based on the second proof, the third proof, and the entries added to the ledger between the second point in time and the third point in time, the integrity of the tamper-resistant ledger between the second point in time and the third point in time.

5. The method of claim 3, wherein said performing an action comprises at least one of:

generating a report comprising a result of verifying the integrity of the tamper-resistant ledger, notifying a user that the tamper-resistant ledger has failed verification; or initiating an audit of the tamper-resistant ledger.

6. The method of claim 1, wherein the server comprises a publicly-accessible server that provides the periodic proofs to any entity interested in verifying the integrity of the tamper-resistant ledger.

7. The method of claim 1, wherein at least one of the first proof or the second proof comprise at least one of:

a cryptographic proof; or a zero-knowledge proof.

8. A system comprising:

a processor; and a memory device that stores program code structured to cause the processor to:

obtain a first proof associated with a verification of the integrity of a tamper-resistant ledger at a first point in time;

obtain, at a second point in time occurring after the first point in time, entries added to the tamper-resistant ledger between the first point in time and the second point in time;

perform, based on the first proof value and the entries added to the tamper-resistant ledger between the first point in time and the second point in time, a second proof to verify the integrity of the tamper-resistant ledger at the second point in time; and provide the second proof to a server that maintains periodic proofs associated with periodic verifications of the integrity of the tamper-resistant ledger at periodic points in time, the periodic proofs enabling a verifier to incrementally verify the integrity of the tamper-resistant ledger by incrementally verifying the periodic proofs.

9. The system of claim 8, wherein, to perform, based on the first proof value and the entries added to the tamper-resistant ledger between the first point in time and the second point in time, a second proof to verify the integrity of the tamper-resistant ledger at the second point in time, the program code is structured to cause the processor to:

compute a hash tree for entries added to the tamper-resistant ledger between the first point in time and the second point in time; and verify the hash tree.

10. The system of claim 8, wherein the program code is structured to cause the processor to:

obtain, from the server, the first proof and the second proof;

obtain, from the tamper-resistant ledger, entries added to the tamper-resistant ledger between the first point in time and the second point in time;

verify, based on the first proof, the second proof, and the entries added to the ledger between the first point in time and the second point in time, the integrity of the tamper-resistant ledger between the first point in time and the second point in time; and responsive to verifying the integrity of the tamper-resistant ledger, perform an action.

11. The system of claim 10, wherein, to perform an action, the program code is structured to cause the processor to:

obtain a third proof associated with a verification of the integrity the tamper-resistant ledger at a third point in time occurring after the second point in time;

24 obtain, from the tamper-resistant ledger, entries added to the ledger between the second point in time and the third point in time; and verify, based on the second proof, the third proof, and the entries added to the ledger between the second point in time and the third point in time, the integrity of the tamper-resistant ledger between the second point in time and the third point in time.

12. The system of claim 10, wherein, to perform an action, the program code is structured to cause the processor to perform at least one of:

generate a report comprising a result of verifying the integrity of the tamper-resistant ledger, notify a user that the tamper-resistant ledger has failed verification; or initiate an audit of the tamper-resistant ledger.

13. The system of claim 8, wherein the server comprises a publicly-accessible server that provides the periodic proofs to any entity interested in verifying the integrity of the tamper-resistant ledger.

14. The system of claim 8, wherein at least one of the first proof or the second proof comprise at least one of:

a cryptographic proof; or a zero-knowledge proof.

15. A computer-readable storage medium comprising executable instructions that, when executed by a processor, cause the processor to:

obtain a first proof associated with a verification of the integrity of a tamper-resistant ledger at a first point in time;

obtain a second proof associated with a verification of the integrity of the tamper-resistant ledger at a second point in time occurring after the first point in time;

obtain, from the tamper-resistant ledger, entries added to the tamper-resistant ledger between the first point in time and the second point in time;

verify, based on the first proof, the second proof, and the entries added to the ledger between the first point in time and the second point in time, the integrity of the tamper-resistant ledger between the first point in time and the second point in time; and responsive to verifying the integrity of the tamper-resistant ledger, perform an action.

16. The computer-readable storage medium of claim 15, wherein, to perform an action, the executable instructions, when executed by the processor, cause the processor to:

obtain a third proof associated with a verification of the integrity the tamper-resistant ledger at a third point in time occurring after the second point in time;

obtain, from the tamper-resistant ledger, entries added to the ledger between the second point in time and the third point in time; and verify, based on the second proof, the third proof, and the entries added to the ledger between the second point in time and the third point in time, the integrity of the tamper-resistant ledger between the second point in time and the third point in time.

17. The computer-readable storage medium of claim 15, wherein, to perform an action, the executable instructions, when executed by the processor, cause the processor to perform at least one of:

generate a report comprising a result of verifying the integrity of the tamper-resistant ledger, notify a user that the tamper-resistant ledger has failed verification; or initiate an audit of the tamper-resistant ledger.

18. The computer-readable storage medium of claim 15, wherein, to obtain the first proof, the executable instructions, when executed by the processor, cause the processor to:

request the first proof from a server that maintains periodic proofs associated with periodic verifications of the integrity of the tamper-resistant ledger at periodic points in time; and receive, from the server, the first proof.

19. The computer-readable storage medium of claim 18, wherein the server comprises a publicly-accessible server that provides the periodic proofs to any entity interested in verifying the integrity of the tamper-resistant ledger.

20. The computer-readable storage medium of claim 15, wherein at least one of the first proof or the second proof comprises at least one of:

a cryptographic proof; or a zero-knowledge proof.

\* \* \* \* \*